(12) United States Patent
Sasaki et al.

(10) Patent No.: US 12,015,846 B2
(45) Date of Patent: Jun. 18, 2024

(54) IMAGING APPARATUS WITH AUTOFOCUS CONTROL BASED ON MOVEMENT TENDENCY

(71) Applicant: Panasonic Intellectual Property Management Co., Ltd., Osaka (JP)

(72) Inventors: Kiyokazu Sasaki, Nara (JP); Junpei Matsuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 201 days.

(21) Appl. No.: 17/750,336

(22) Filed: May 21, 2022

(65) Prior Publication Data

US 2022/0408027 A1 Dec. 22, 2022

(30) Foreign Application Priority Data

Jun. 18, 2021 (JP) ................................ 2021-101685

(51) Int. Cl.
*H04N 23/67* (2023.01)
*H04N 23/61* (2023.01)

(52) U.S. Cl.
CPC .......... *H04N 23/675* (2023.01); *H04N 23/61* (2023.01)

(58) Field of Classification Search
CPC .... H04N 23/675; H04N 23/61; H04N 23/673; H04N 23/60
USPC ...................................................... 348/349
See application file for complete search history.

(56) References Cited

U.S. PATENT DOCUMENTS

| | | | |
|---|---|---|---|
| 8,164,643 B2 * | 4/2012 | Yoshizumi | H04N 23/61 348/222.1 |
| 2005/0046730 A1 * | 3/2005 | Li | H04N 23/635 348/333.12 |
| 2009/0016645 A1 * | 1/2009 | Sako | H04N 1/2112 382/298 |
| 2009/0073304 A1 * | 3/2009 | Kumagai | G03B 13/36 348/E5.042 |
| 2010/0066840 A1 * | 3/2010 | Asukai | H04N 5/262 348/222.1 |
| 2012/0044408 A1 * | 2/2012 | Sasaki | H04N 23/673 348/E5.045 |
| 2014/0293119 A1 * | 10/2014 | Hamano | H04N 23/672 348/350 |
| 2019/0020826 A1 | 1/2019 | Takehara et al. | |

FOREIGN PATENT DOCUMENTS

| | | |
|---|---|---|
| JP | 2015-194648 A | 11/2015 |
| JP | 2016-061884 A | 4/2016 |
| JP | 2019-020716 A | 2/2019 |

* cited by examiner

*Primary Examiner* — Usman A Khan
(74) *Attorney, Agent, or Firm* — Renner, Otto, Boisselle & Sklar, LLP (57) ABSTRACT

An imaging apparatus includes: an image sensor that captures a subject image formed via an optical system to generate image data; a controller that controls an autofocus operation to focus the optical system; and an image recognizer that identifies, based on the image data, information including a class of a subject in an image shown by the image data, wherein the controller acquires the information identified by the image recognizer to automatically set a parameter indicating characteristics of the autofocus operation, based on a tendency to be estimated as possibility for the subject of the identified class to move on the image.

7 Claims, 8 Drawing Sheets

| SETTING TABLE | | | | |
|---|---|---|---|---|
| AF parameter | Setting 1 | Setting 2 | Setting 3 | Setting 4 |
| Tracking sensitivity | 0 | +1 | −1 | 0 |
| Area switching sensitivity | 0 | −1 | +1 | +1 |
| Subject movement | +1 | 0 | +2 | +2 |

IMAGING APPARATUS WITH AUTOFOCUS CONTROL BASED ON MOVEMENT TENDENCY

BACKGROUND

1. Technical Field

The present disclosure relates to an imaging apparatus that performs an autofocus operation.

2. Related Art

JP 2019-020716 A discloses a control apparatus capable of continuing to track an object appropriately during a tracking operation, on an image capturing apparatus that performs focus adjustment on a subject. The control apparatus includes: a focus detection unit that detects a defocus amount; a control unit that automatically changes a parameters related to a tracking operation during the tracking operation depending on an image capturing state such as movement of a subject; and a focusing unit that performs focusing based on the defocus amount and the parameters. The control unit repeatedly calculates a motion vector or an image plane velocity to use to set the parameters. By this operation, the parameters related to the tracking operation are continuously set depending on the movement of the subject that changes from moment to moment.

SUMMARY

The present disclosure provides an imaging apparatus capable of facilitating to set characteristics easily.

In the present disclosure, an imaging apparatus includes: an image sensor that captures a subject image formed via an optical system to generate image data; a controller that controls an autofocus operation to focus the optical system; and an image recognizer that identifies, based on the image data, information including a class of a subject in an image shown by the image data. The controller acquires the information identified by the image recognizer, to automatically set a parameter indicating characteristics of the autofocus operation, based on a tendency to be estimated as possibility for the subject of the identified class to move on the image.

The imaging apparatus of the present disclosure makes it possible to easily set characteristics of an autofocus operation.

DETAILED DESCRIPTION

Hereinafter, embodiments will be described in detail with reference to the drawings as appropriate. However, an unnecessarily detailed description will be omitted in some cases. For example, detailed descriptions of already well-known matters and repetition of descriptions of substantially the same configuration will be omitted in some cases. This is to prevent the following description from being unnecessarily redundant and to facilitate those skilled in the art to understand the present disclosure. Note that the inventor or inventors provide the accompanying drawings and the following description for those skilled in the art to fully understand the present disclosure and the drawings and the description are not intended to limit the subject matters of the claims.

First Embodiment

In the first embodiment, as an example of an imaging apparatus according to the present disclosure, a description will be given to a digital camera that identifies a class of a subject and the like by an image recognition technology based on machine learning or the like and controls an autofocus (AF) operation.

1. Configuration

Figure 1:
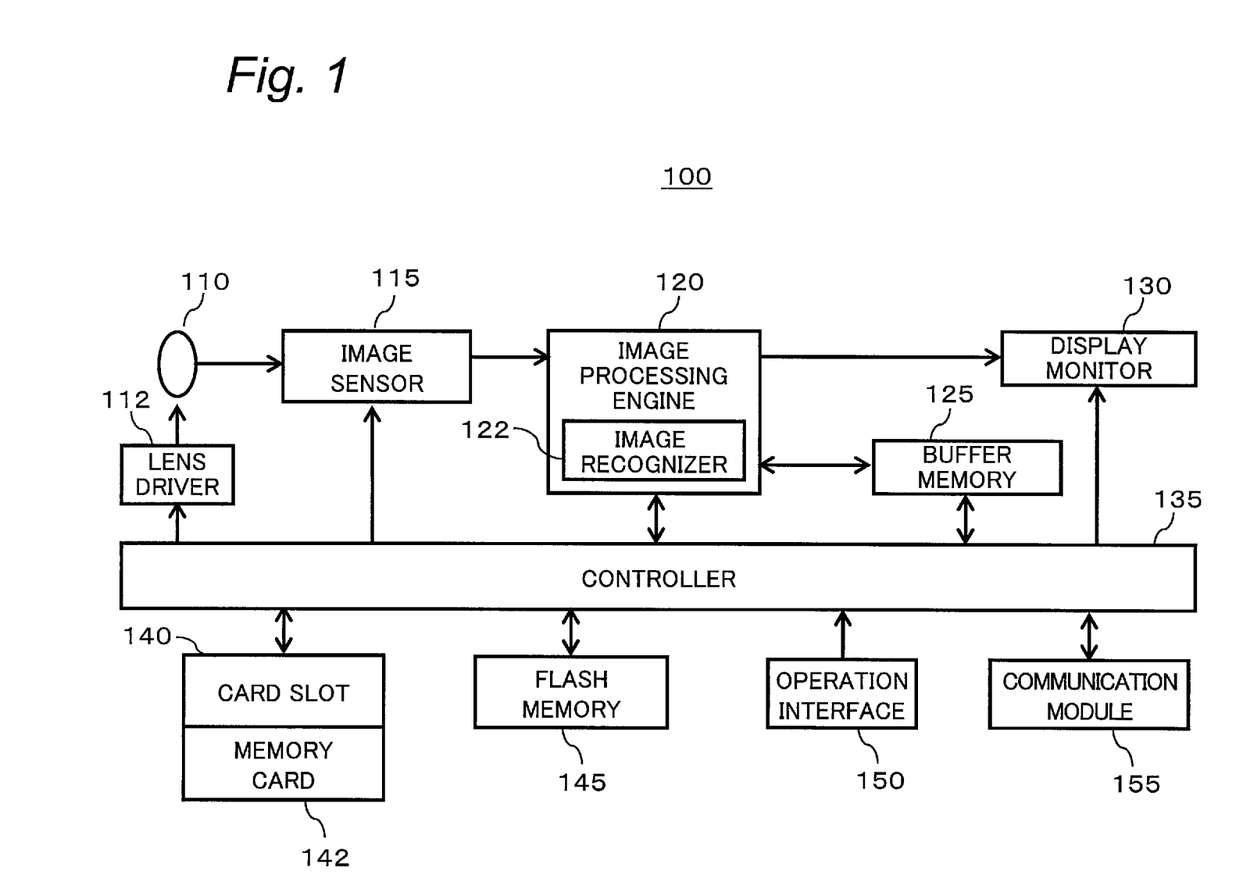
FIG. 1 is a diagram illustrating a configuration of a digital camera according to a first embodiment of the present disclosure.

With reference to FIG. 1, a configuration of a digital camera according to the first embodiment will be described.

FIG. 1 is a diagram illustrating the configuration of a digital camera 100 according to the present embodiment. The digital camera 100 of the present embodiment includes an image sensor 115, an image processing engine 120, a display monitor 130, and a controller 135. The digital camera 100 further includes a buffer memory 125, a card slot 140, a flash memory 145, an operation interface 150, and a communication module 155. The digital camera 100 further includes, for example, an optical system 110 and a lens driver 112.

The optical system 110 includes a focusing lens, a zooming lens, an optical image stabilization (OIS) lens, an aperture diaphragm, a shutter, and the like. The focusing lens is a lens for changing a focusing state of a subject image formed on the image sensor 115. The zooming lens is a lens for changing a magnification ratio of a subject image formed by the optical system. The focusing lens and the other lenses are each configured with one or a plurality of lenses.

The lens driver 112 drives the focusing lens and the like in the optical system 110. The lens driver 112 includes a motor to move the focusing lens along an optical axis of the optical system 110 under the control of the controller 135. A configuration, in the lens driver 112, for driving the focusing lens can be realized by a DC motor, a stepping motor, a servo motor, an ultrasonic motor, or the like.

The image sensor 115 captures a subject image formed via the optical system 110 and generates imaging data. The imaging data is image data showing a captured image by the image sensor 115. The image sensor 115 generates new frames of image data, for example, at a predetermined frame rate (e.g., 30 frames/second). The controller 135 controls a generation timing of the imaging data and an operation of an electronic shutter in the image sensor 115. As the image sensor 115, it is possible to use various image sensors such as a complementary metal-oxide semiconductor (CMOS) image sensor, a charge-coupled device (CCD) image sensor, or an re-channel metal oxide semiconductor (NMOS) image sensor.

The image sensor 115 performs an operation of capturing a still image, an operation of capturing a through image, and the like. The through image is mostly a moving image and is displayed on the display monitor 130 for a user to determine a composition for image capturing of a still image. The through image and the still image are each an example of a captured image in the present embodiment. The image sensor 115 is an example of an image sensor of the present embodiment.

The image processing engine 120 performs various processing on the imaging data outputted from the image sensor 115 to generate image data and performs various processing on the image data to generate an image to be displayed on the display monitor 130. Examples of the various processing include white balance correction, gamma correction, YC conversion processing, electronic zoom processing, compression processing, and decompression processing, but the processing is not limited to these examples. The image processing engine 120 may be configured with a hard-wired electronic circuit, and may be configured with a microcomputer, a processor, or the like using a program.

In the present embodiment, the image processing engine 120 includes an image recognizer 122 that realizes a function of identifying a subject and the like including a human, by image recognition of a captured image. Details of the image recognizer 122 will be described later.

The display monitor 130 is an example of a display to display various information. For example, the display monitor 130 displays an image (through image) shown by image data that is captured by the image sensor 115 and is subjected to image processing of the image processing engine 120. The display monitor 130 further displays a menu screen or the like for a user to set various settings of the digital camera 100. The display monitor 130 can be configured with, for example, a liquid crystal display device or an organic electroluminescence (EL) device.

The operation interface 150 is a collective name for hardware keys such as operation buttons and operation levers provided on an outer casing of the digital camera 100 and receives an operation by a user. The operation interface 150 includes, for example, a shutter release button, a mode dial, and a touch panel. When receiving an operation by a user, the operation interface 150 transmits to the controller 135 an operation signal corresponding to the user operation.

The controller 135 collectively controls operation of the whole of the digital camera 100. The controller 135 includes a central processing unit (CPU) and the like, and the CPU executes a program (software) to realize predetermined functions. Instead of the CPU, the controller 135 may include a processor configured with a dedicated electronic circuit designed to realize predetermined functions. That is, the controller 135 can be realized by various processors such as a CPU, a microprocessor unit (MPU), a graphic processor unit (GPU), a DSU, a field programmable gate array (FPGA), and an application specific integrated circuit (ASIC). The controller 135 may be configured with one or a plurality of processors. The controller 135 may be configured with one semiconductor chip together with the image processing engine 120 and the like.

The buffer memory 125 is a recording medium functioning as a working memory for the image processing engine 120 and the controller 135. The buffer memory 125 is realized by a dynamic random access memory (DRAM) or other component. The flash memory 145 is a nonvolatile recording medium. Further, not shown in the drawings, the controller 135 may include various internal memories and may incorporate a read-only memory (ROM), for example. The ROM stores various programs to be executed by the controller 135. Further, the controller 135 may incorporate a random access memory (RAM) functioning as a working area for the CPU.

The card slot 140 is a module into which a detachable memory card 142 is inserted. To the card slot 140, the memory card 142 can be electrically and mechanically connected. The memory card 142 is an external memory including therein a recording element such as a flash memory. The memory card 142 can store data such as image data generated by the image processing engine 120.

The communication module 155 is a communication module (circuit) that performs communication in conformity with the communication standard IEEE 802.11, the Wi-Fi standard, or the like. The digital camera 100 can communicate with other devices via the communication module 155. The digital camera 100 may directly communicate with other devices via the communication module 155, or may communicate via an access point. The communication module 155 may be connectable to a communication network such as the Internet.

1-1. Image Recognizer

Details of the image recognizer 122 in the present embodiment will be described below.

The image recognizer 122 employs a learned model by a neural network such as a convolutional neural network. The image recognizer 122 acquires information showing a captured image by the image sensor 115, and executes image recognition processing by the model. The image recognizer 122 may be configured by cooperation of the image processing engine 120 and the controller 135.

In the processing of the learned model in the image recognizer 122, for example, position information indicating the areas in an input image in which subjects each classified into any of a plurality of previously set categories are imaged are outputted in association with respective ones of the categories. The plurality of categories each show, for example, one of various subject classes such as a human, an animal, and a vehicle. The position information is defined by, for example, horizontal coordinates and vertical coordinates on a processing target image, and indicates, for example, a rectangular region surrounding the detected subject.

As the categories in the image recognizer 122, various categories can be employed. For example, the above category of animal may be further classified depending on the type of animal, and for example, categories such as a dog, a cat, and a bird may be separately set. In addition, the category of vehicle may be classified into a railway, a motorcycle, an automobile, and the like. Furthermore, the category of human may be classified by an individual, gender, age, nationality, and the like. Further, the image recognizer 122 may perform image recognition to identify an image-shooting scene of an input image by, for example, category classes of a plurality of previously set image-shooting scenes.

The learned model of the image recognizer 122 as described above can be obtained, for example, by supervised learning using, as teacher data, image data associated with a correct answer label indicating that an image in which a subject of each category appears is the correct answer. The learned model may generate reliability or likelihood of the detection result of each category.

The learned model of the image recognizer 122 is not necessarily of the neural network, and may be a machine learning model related to various image recognition. Further, the image recognizer 122 may employ not only machine learning but also various image recognition algorithms. Further, the image recognizer 122 may be configured such that rule-based image recognition processing is performed to detect some categories such as a face and pupils of a human. The image recognizer 122 may be configured with, for example, a DSP or the like. Furthermore, the image recognizer 122 may be configured separately from the image processing engine 120, or may be configured integrally with the controller 135.

2. Operation

A description will be given below to the operation of the digital camera 100 configured as described above.

The digital camera 100 captures, with the image sensor 115, a subject image formed via the optical system 110 and generates imaging data. The image processing engine 120 performs various processing on the imaging data generated by the image sensor 115 to generate image data. For example, in the operation of capturing a still image or a moving image, the controller 135 records image data generated by the image processing engine 120 in the memory card 142 attached to the card slot 140.

The digital camera 100 displays a through image on the display monitor 130 in the operation of capturing a through image. The user can check the composition for shooting an image, by the through image on the display monitor 130. For example, in response to an operation of the shutter release button by the user, the controller 135 controls the AF operation in which the focusing lens of the optical system 110 is driven by the lens driver 112 so as to automatically focus on a subject.

In the digital camera 100, the AF operation is executed in a state where parameters indicating various characteristics of the AF operation (hereinafter, referred to as "AF parameters") are set. In the digital camera 100, such AF parameters can be customized, for example. By optimizing the settings of the AF parameters in various image-shooting, it is possible to reduce failures in image-shooting.

2-1. AF Parameters

Figure 2A:
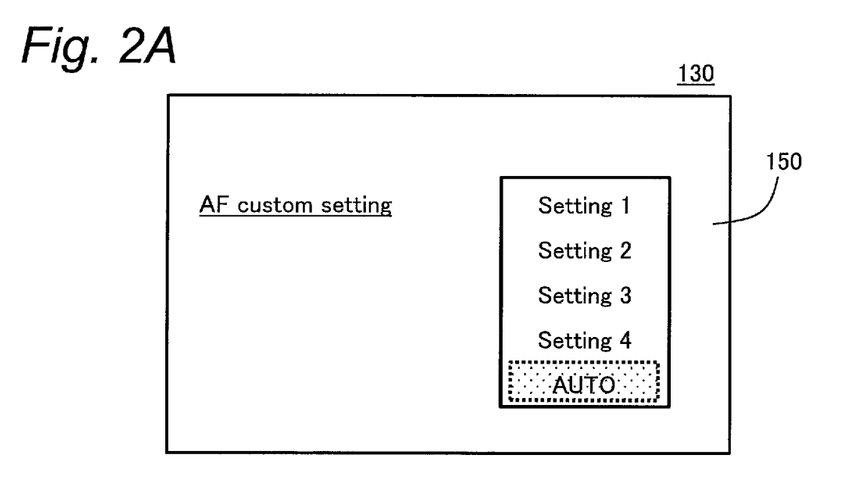
FIGS. 2A and 2B are diagrams for each illustrating customization setting of autofocus (AF) parameters in the digital camera.
Figure 2B:
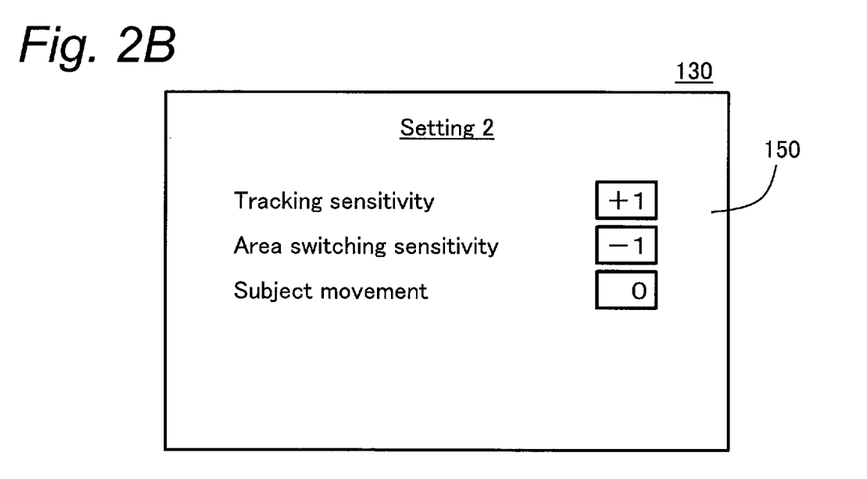
Figure 3:
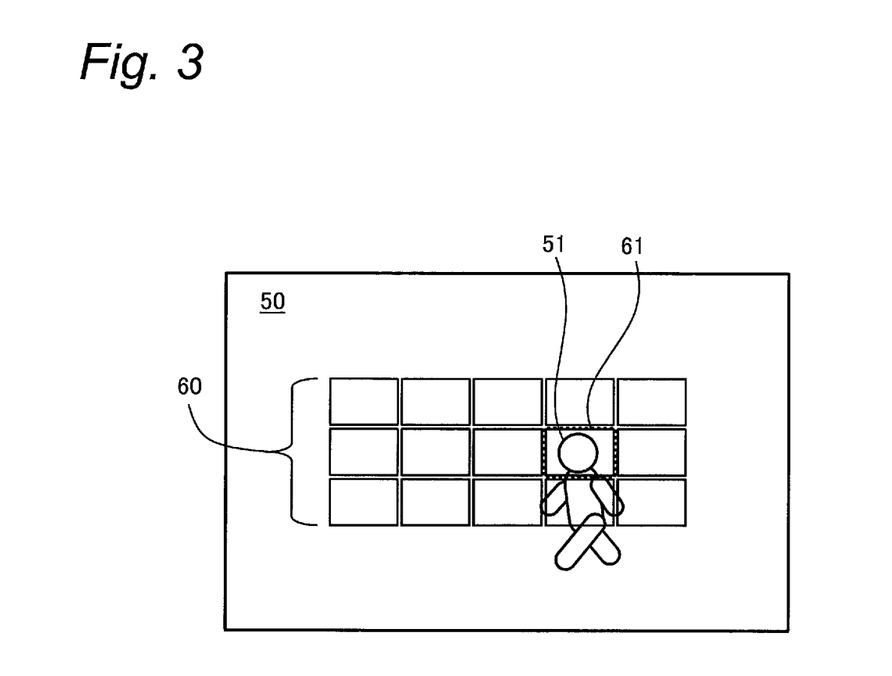
FIG. 3 is a diagram for describing AF areas in the digital camera.
Figure 4:
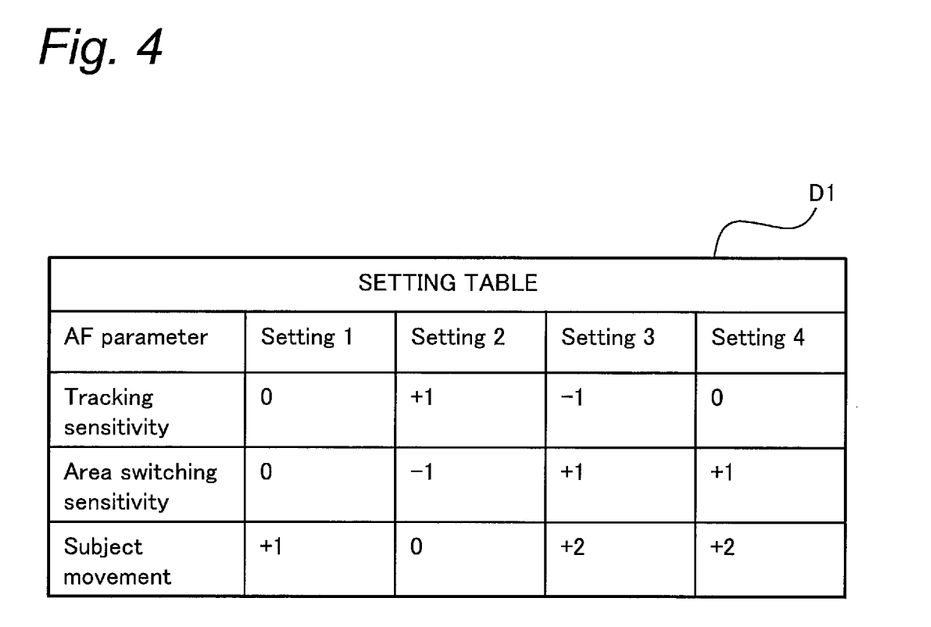
FIG. 4 is a diagram exemplifying a setting table of the AF parameters of the digital camera.

With reference to FIGS. 2 to 4, a description will be given to the AF parameters and customization setting of the AF parameters in digital camera 100 according to the present embodiment.

FIGS. 2A and 2B are diagrams each for describing the customization setting of the AF parameters in the digital camera 100. FIG. 2A illustrates a display example of a menu screen in the customization setting of the AF parameters. FIG. 2B illustrates a display example of a setting screen for the AF parameters.

In the example of FIG. 2A, the display monitor 130 of the digital camera 100 displays a menu item "AF custom setting" for customizing the AF parameters, and displays as options "Setting 1" to "Setting 4" and "AUTO" that can be set for the menu item. The digital camera 100 according to the present embodiment receives, on the operation interface 150 such as a touch panel or operation buttons, a user operation for selecting one option in the setting menu as described above, for example.

FIG. 2B illustrates a display example of "Setting 2" in the "AF custom setting". In the present example, as illustrated in FIGS. 2A and 2B, the digital camera 100 has three AF parameters of "tracking sensitivity", "area switching sensitivity", and "subject movement". The above AF parameters are related to the AF area used when the AF operation is performed.

FIG. 3 is a diagram for describing the AF area in the digital camera 100. FIG. 3 illustrates an example in which a plurality of AF areas 60 are arranged on an image 50 captured by the image sensor 115. In this example, one AF area 61 among the plurality of AF areas 60 is being used as a focus target.

The AF parameter "tracking sensitivity" indicates the sensitivity with which the focus position (the position of the focusing lens) is made to track fluctuation for the subject 51 moving a back-and-forth within the AF area 61 that is in use as the focus target in the AF operation. More sensitive focusing characteristics can be obtained, as the parameter is larger. Then, even when a distance to the subject 51 changes, the subject 51 can be immediately focused on again. On the other hand, in a case where this parameter is set to be relatively small (e.g., negative), characteristics of the AF operation can be obtained so that the focusing does not change quickly in response to the above fluctuation, that is, the focus position is not immediately made to track but remain.

The AF parameter "area switching sensitivity" indicates the sensitivity with which the focus target is switched from the currently used AF area 61 to another area in the plurality of AF areas 60 in accordance with the fluctuation for the subject 51 moving in a vertical and horizontal on the image 50. As the parameter is larger, the characteristics capable of more sensitively switching the AF area 61 is obtained. Then, even when the subject 51 gets out of the currently used AF area 61, a surrounding AF area 60 is immediately changed to the focus target. On the other hand, in a case where this parameter is set to be relatively small (e.g., negative), the characteristics can be obtained so that the AF area 61 as the focus target is not changed quickly. For example, it is possible to suppress influence of a slight movement of the subject 51 and an obstacle entering the frame.

The AF parameter "subject movement" indicates a degree to which movement prediction is made to work, during the AF operation, in response to a change in speed of the movement of the subject 51. As the parameter is larger, it is possible to obtain such characteristics that the AF operation works to focus more sensitively responding to a rapid change in speed of the subject 51. Then, even when the movement of the subject 51 randomly changes, the focus position can be easily made to track in the AF operation. On the other hand, in a case where this parameter is set to be relatively small (e.g., set to be 0), the characteristics can be obtained so that it is easy to focus when the movement or the moving speed of the subject 51 is constant.

FIG. 4 exemplifies a setting table D1 of the AF parameters in the digital camera 100. The setting table D1 of FIG. 4 exemplifies the settings of the AF parameters in Setting 1 to Setting 4 of FIG. 2A. The setting table D1 is stored in, for example, the flash memory 145 of the digital camera 100.

For example, Setting 2 (see FIG. 2B) is a setting suitable for a case where the subject moves at a constant speed in a constant direction. Therefore, the parameter "tracking sensitivity" is set to a positive value, and the parameter "subject movement" is set to 0. In addition, as it is assumed that there are few obstacles, the parameter "area switching sensitivity" is set to a negative value. For example, the image-shooting scene can be considered for a vehicle such as a railway, or a sport such as track and field.

Setting 1 is a general-purpose basic setting and has an average setting value in each of the above parameters.

Setting 3 is a setting suitable for a case assuming that the subject moves right and left as well as back and forth and that there are many obstacles. For example, the image-shooting scenes can be considered for ball games among sports. Setting 4 is a setting suitable for a case where the change in speed of the subject is large. For example, the image-shooting scene can be considered for a subject such as a motorcycle among vehicles.

By the customization setting of the AF parameters as described above, the user can select a desired setting from the various settings 1 to 4 as described above or can change the setting value of each parameter in each setting. However, such setting of the AF parameters should be performed for every shooting, which situation would be troublesome to the user.

To address the above issue, the digital camera 100 of the present embodiment has a function of automatically performing the above-described setting of the AF parameters. For example, in the setting menu shown in FIG. 2A, when a user operation is performed to select "AUTO", the digital camera 100 enables an automatic setting function of the AF parameters.

2-2. Overall Operation

Figure 5:
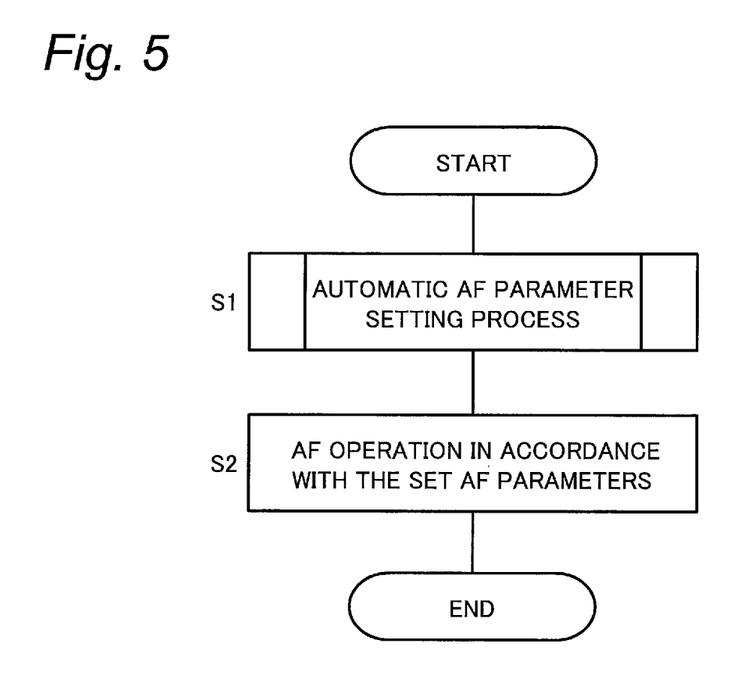
FIG. 5 is a flowchart for describing an operation of the digital camera according to the first embodiment.

With reference to FIG. 5, a description will be given to an overall operation when an automatic setting function of the AF parameters is enabled in the digital camera 100 of the present embodiment.

FIG. 5 is a flowchart exemplifying an operation of the digital camera 100 in the present embodiment. Each process illustrated in this flowchart is executed by the controller 135 of the digital camera 100, for example.

At first, the controller 135 of the digital camera 100 executes the process of automatically setting the AF parameters (step S1). In the automatic AF parameter setting process (step S1) according to the present embodiment, optimum AF parameters are automatically set based on the tendency to be estimated whether the identified subject will move on the image during the AF operation, by using the identification result such as the class of the subject classified by the image recognizer 122. Details of the automatic AF parameter setting process (step S1) will be described later.

For example, the process of step S1 is performed when a predetermined user operation such as a pressing operation of the shutter release button of the operation interface 150 is input. The process of step S1 may be performed at a predetermined cycle while the digital camera 100 is on standby for shooting, or may be performed at various timings before the AF operation (step S2) is performed.

Next, the controller 135 executes the AF operation in accordance with the set AF parameters (step S2). For example, during the AF operation, the controller 135 obtains an AF evaluation value and detects the movement of the subject by various methods. The AF evaluation value is an evaluation value for an in-focus state in the corresponding AF area, e.g. a contrast evaluation value calculated from a high-frequency component of the image in the AF area in a contrast AF operation.

In such an AF operation, the controller 135 reflects the set AF parameters on the characteristics responding to a real-time movement of the subject (step S2). For example, the controller 135 controls a criterion in accordance with the "tracking sensitivity" of the set AF parameters. The criterion is used to determine whether or not to cause the focus position to track in response to the fluctuation in the real-time AF evaluation value in the AF area 61 (FIG. 3) as the focus target, or in response to the fluctuation in the distance of the subject 51.

In step S2, the controller 135 controls a criterion in accordance with the set "area switching sensitivity". The criterion is used to determine whether or not to switch the AF area 61 in response to detecting the movement of the subject 51 on the image plane during the AF operation. Further, the controller 135 controls, in accordance with the set "subject movement", a degree to which a result of moving object prediction is used for driving of the focus position or other purpose, where the moving object prediction is the subsequent prediction of the detected subject movement during the AF operation.

The controller 135 executes the AF operation (step S2) as described above, and ends the process shown in the flowchart.

According to the operation of the digital camera 100 described above, the image recognition technology such as machine learning is used to in advance optimize the setting of the AF parameters prior to the AF operation (step S2), on the basis of the estimation of the possibility that the subject moves (step S1). This can cause the subsequent AF operation (step S2) to work more appropriately in accordance with the actual movement of the subject.

2-2-1. Automatic AF Parameter Setting Process

The automatic AF parameter setting process in step S1 of FIG. 5 will be described with reference to FIGS. 6 to 8.

Figure 6:
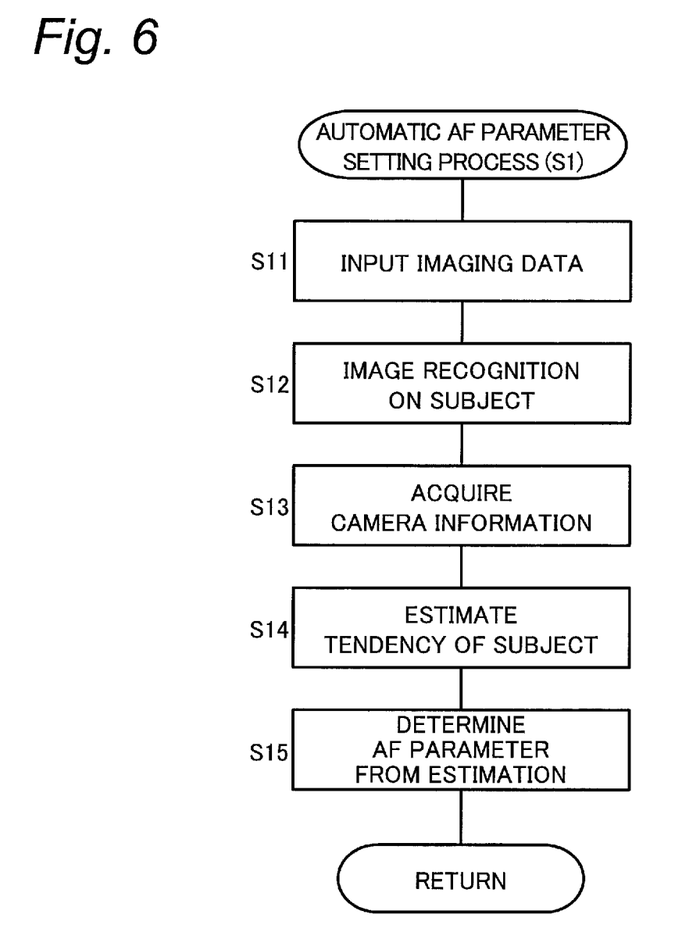
FIG. 6 is a flowchart illustrating an automatic AF parameter setting process in the digital camera.
Figure 7:
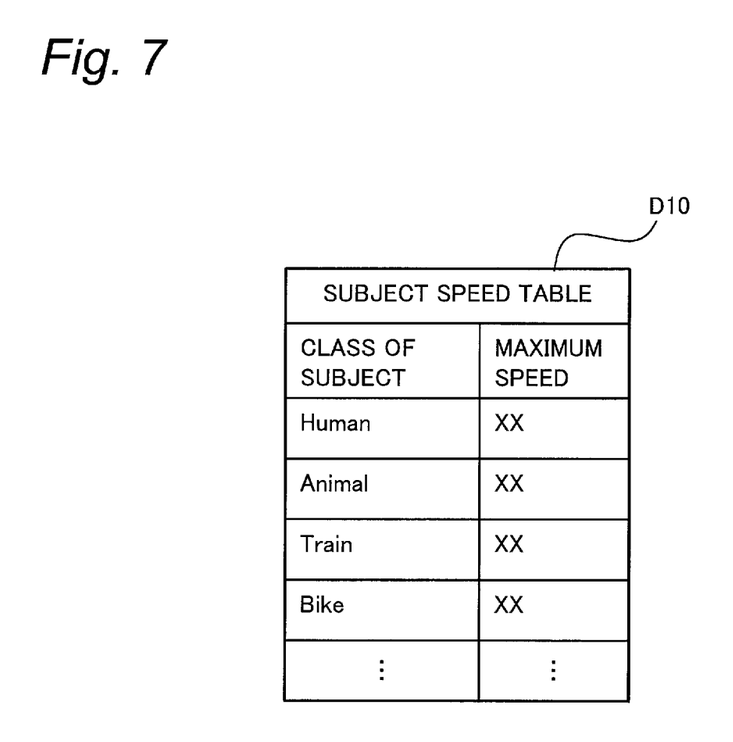
FIG. 7 is a diagram exemplifying a subject speed table in the digital camera.

FIG. 6 is a flowchart illustrating the automatic AF parameter setting process in the digital camera 100 (step S1 of FIG. 5). FIG. 7 is a diagram exemplifying a subject speed table D10 in the digital camera 100. Hereinafter, a description will be given to a process example that uses the subject speed table D10 corresponding to the classes of the subject classified by the image recognizer 122.

At first, the controller 135 of the digital camera 100 causes the image sensor 115 to execute an image capturing operation, to input imaging data showing the captured image to the image recognizer 122 (step S11). The image sensor 115 generates imaging data in the operation of capturing a through image or the like, and outputs the imaging data to the image recognizer 122 in the image processing engine 120, for example.

Next, the controller 135 acquires image recognition information including various information identified from the imaging data in the image recognizer 122 (step S12). For example, the image recognizer 122 causes the image processing engine 120 to perform image recognition processing for the subject, based on the imaging data input from the image sensor 115. In this image recognition processing, the class of the subject in the image shown by the imaging data is determined from a plurality of preset classes, and a size of the region in which the subject identified on the image is located is determined, for example.

Further, the controller 135 acquires camera information indicating a setting state of each part in the digital camera 100, for example (step S13). For example, the camera information includes a focal length and a focus position of the optical system 110 of the digital camera 100, and indicates a viewing angle area and a subject distance that is a distance to a focused point from the digital camera 100.

Next, the controller 135 calculates an estimated movement amount for the identified subject, based on the acquired image recognition information and the camera information (step S14). The estimated movement amount is a movement amount that the subject image is supposed to be able to move on the image plane of the image sensor 115, for example. Such a process of step S14 is an example of a process to realize preliminary estimation of a behavior of how the subject can move on the image during the AF operation (step S2).

In the estimation in step S14, the class of the subject identified in the image recognition (step S12) makes it possible to grasp a maximum moving speed at which the subject may move in a physical environment. Therefore, in the example as illustrated in FIG. 7, the digital camera 100 previously stores, in the flash memory 145, the subject speed table D10 in which the classes of the subject and maximum speeds are managed in association with each other.

Further, the size of the subject identified in the image recognition (step S12) and the current camera information (step S13) make it possible to grasp the positional relation between the digital camera 100 and the subject. For example, based on the above information, the controller 135 of the digital camera 100 can calculate a coefficient for converting a displacement of the subject in the physical environment into a displacement on the image plane. For example, by multiplying the conversion coefficient by the maximum speed associated with a specific class in the subject speed table D10, the controller 135 calculates the estimated movement amount as an estimation result of step S14.

Next, based on the estimation result of the tendency of the subject (step S14), the controller 135 determines setting values for the AF parameters to set in the digital camera 100 (step S15). For example, as the estimated movement amount calculated in step S14 is larger, the controller 135 sets the AF parameter such as "area switching sensitivity" to be larger. The controller 135 stores the determined AF parameters in the flash memory 145 or the like as setting information for the AF operation (step S2) of digital camera 100.

The controller 135 sets the AF parameters in the digital camera 100 as described above (step S15), to end the automatic AF parameter setting process (step S1). Then, the controller 135 proceeds to step S2 of FIG. 5, for example.

According to the automatic AF parameter setting process (step S1) described above, a subsequent tendency of the subject on an image to be captured can be estimated (step S14) on the basis of the image recognition information (step S12) identified by the image recognizer 122 and the camera information (step S13) currently set in the digital camera 100. According to this, it is possible to automatically set the AF parameters optimized for the subsequent AF operation.

In step S12 described above, an example in which the class of the subject and the like are identified by the image recognition has been described. The image recognition in step S12 is not limited thereto, and for example, an image-shooting scene may be identified. In this case, the controller 135 may set the AF parameters by using an identification result of the image-shooting scene by the image recognition (step S15). Such a modification will be described with reference to FIG. 8.

Figure 8:
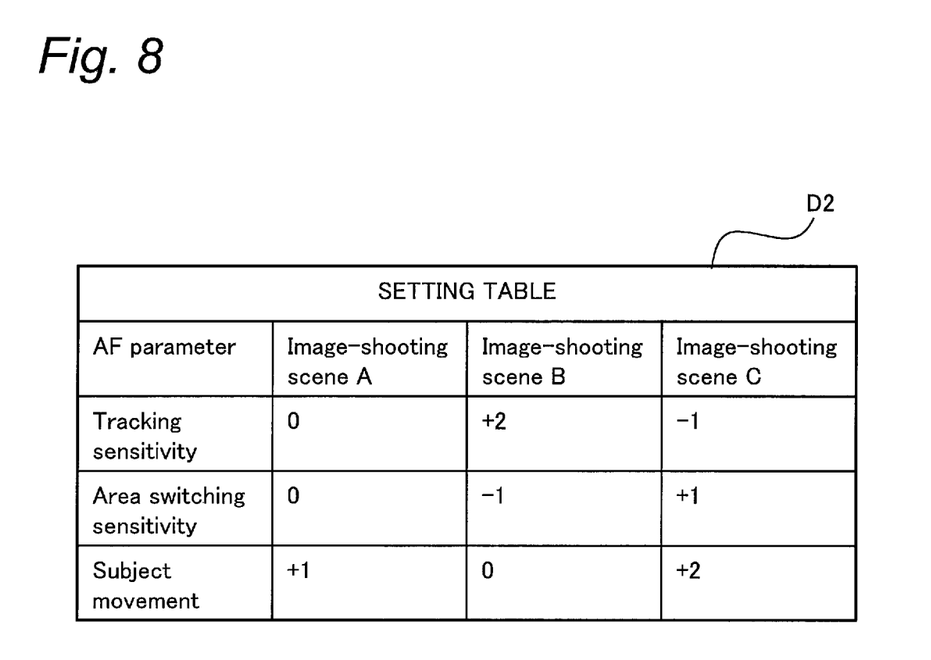
FIG. 8 is a diagram illustrating a variation of the setting table of the AF parameters in the digital camera.

FIG. 8 exemplifies a setting table D2 of AF parameters for image-shooting scenes. For example, in the image recognition (step S12), the digital camera 100 may identify the image-shooting scene with respect to a trend of a movement of the subject. In the example of FIG. 8, the setting table D2 includes setting examples of the AF parameters in the following image-shooting scenes such as: an image-shooting scene A in which a movement of a human is relatively gentle (e.g., walking); an image-shooting scene B in which a human moves at a constant speed (e.g., track and field competition); and an image-shooting scene C in which people cross each other (e.g., ball game).

In the digital camera 100 of the present example, the machine learning of the image-shooting scenes A to C as described above is previously performed for the image recognizer 122, for example. Further, as FIG. 8 exemplifies, information in which the image-shooting scenes A to B are associated with the AF parameters is stored in advance in the flash memory 145 of the digital camera 100, for example.

At the time of the AF parameter setting process (step S1), the image recognizer 122 identifies the current image-shooting scene from the imaging data (step S12), to set the image recognition information into the identification result of the image-shooting scene. Based on the image recognition information and the information of the AF parameters associated with the above image-shooting scenes A to C, the controller 135 sets the AF parameters in accordance with the estimation result of the tendency of the subject in the current image-shooting scene (step S15).

Consequently, even in the cases whose class of the subject is the same such as "human", the setting of the AF parameters can be optimized depending on the image-shooting scenes A to C for each case. For example, the controller 135 may, referring to the setting table D2 for image-shooting scenes, correct the setting of the AF parameters based the estimated movement amount for the subject of the identified class so as to be close to the setting for the corresponding image-shooting scene in the setting table D2. In the subject speed table D10, a plurality of speeds for different image-shooting scenes may be stored in each one of the classes.

In step S12, the image recognizer 122 may identify a subject or the like that can be an obstacle at the time of the AF operation. Based on such image recognition information, the controller 135 may estimate the number of obstacles (step S14), and set the "tracking sensitivity" of the AF parameters on the basis of the estimation result (step S15). The controller 135 may estimate a trend of whether the motion of the subject at the time of the AF operation is e.g. random or constant (step S14), and may set the "subject movement" of the AF parameters on the basis of the estimation result (step S15).

In the example described in the above step S14, the estimated movement amount on the image plane is calculated; however, the process of step S14 is not limited to the example. For example, the controller 135 may calculate a movement amount that the subject is supposed to have a possibility to move in a distance direction orthogonal to the image plane, and may use the estimated movement amount for setting various AF parameters.

3. Summary

As described above, in the present embodiment, the digital camera 100, which is an example of an imaging apparatus, includes: the image sensor 115, which is an example of an image sensor; the controller 135; and the image recognizer 122. The image sensor 115 captures a subject image formed via the optical system 110 and generates imaging data as an example of image data. The controller 135 controls an AF operation for focusing the optical system 110. Based on the image data, the image recognizer 122 identifies information including a class of the subject in the image shown by the image data (step S12). The controller 135 acquires the information identified by the image recognizer 122, to automatically set AF parameters, which are examples of the parameters indicating the characteristics of the AF operation, based on a tendency on the basis of which the subject of the identified class is supposed to have a possibility to move on the image (steps S12 to S15).

With the digital camera 100 described above, the AF parameters indicating the characteristics of the AF operation are automatically set based on the tendency of the subject that is supposed from the information identified by the image recognizer 122. This makes it easy to set the characteristics of the AF operation.

In the present embodiment, based on the image recognition information identified by the image recognizer 122 (step S12) and the camera information set in the digital camera 100 (step S13), the controller 135 performs estimation of the tendency of the subject on the image (step S14) and then automatically sets the AF parameters of the AF operation, based on the estimation result of the tendency (step S15). As the estimation of the tendency at the time of the AF operation is performed by using the result of the image recognition as described above, it is possible to easily set the characteristics of the AF operation.

In the present embodiment, the controller 135 calculates an estimated movement amount that is a movement amount indicating the estimation result of the tendency, based on a size of the subject on the image and the class of the subject that are identified by the image recognizer 122, and based on the focal length and the focus position set in the digital camera 100 (step S14). As described above, it is easy to achieve a process in which the tendency is estimated by an arithmetic processing using the image recognition information and the camera information, for example.

In the present embodiment, the controller 135 executes the AF operation, based on the automatically set AF parameters such that the characteristics indicated by the AF parameters are reflected on a response when the subject moves during performance of the AF operation (step S2). As a result, by using the AF parameters set on the basis of the estimation result of the tendency before the AF operation (step S2), the AF operation (step S2) can accurately work according to a real-time movement of the subject.

In the present embodiment, the image recognizer 122 may further identify a scene in which the image shown by the image data is captured. The controller 135 may automatically set the AF parameters of the AF operation, based on the tendency to be estimated as the possibility for the subject to move on the image in the scene identified by the image recognizer 122 (step S14). As a result, even in a case where the class of the subject is the same, the AF parameters are automatically set depending on the image-shooting scene, and thus the characteristics of the AF operation can be easily optimized.

In the present embodiment, the AF parameters include at least one of the followings: the "tracking sensitivity" that is sensitivity with which the focus position is made to track in the AF operation; the "area switching sensitivity" that is sensitivity with which the area as the focus target is switched in the AF operation; and the "subject movement" that is a degree of execution of the movement prediction of the subject in the AF operation. By automatically setting such AF parameters, it is easy to make the AF operation be performed accurately.

In the present embodiment, the digital camera 100 further includes an operation interface 150 that receives an operation to select whether to automatically set the AF parameters or to set the AF parameters by a user operation (see FIG. 2). The digital camera 100 may provide an automatic setting function of the AF parameters in the customization setting of the AF parameters.

Other Embodiments

The first embodiment has been described in the above as an example of the techniques disclosed in the present application. However, the techniques of the present disclosure can be applied not only to the above embodiment but also to an embodiment in which modification, replacement, addition, or removal is appropriately made. Further, it is possible to form a new embodiment by combining the components described in the first embodiment.

The first embodiment has described the "tracking sensitivity" and so on as examples of the AF parameters. In the present embodiment, the AF parameters are not particularly limited to the above examples, and may be a parameter indicating various characteristics in the AF operation. For example, the AF parameters may include a drive speed to drive the AF operation, a reference value for performing wobbling control, and the like. In addition, the automatic setting function of the AF parameters in the present embodiment is not particularly limited to being used for a still image, and is also applicable to a moving image shooting operation.

Furthermore, in the above embodiments, an example of the AF operation of the contrast method has been described, but the present disclosure is not limited thereto. In the present embodiment, the automatic setting function of the AF parameters can be also applied to an AF operation of e.g. an image plane phase detection method in the same manner as the above embodiments.

In the above embodiments, an example has been described in which the digital camera 100 provides the automatic setting function of the AF parameters in the customization setting of the AF parameters (see FIG. 2). In the present embodiment, the digital camera 100 may provide the automatic setting function of the AF parameters separately from the customization setting of the AF parameters. In the digital camera 100 according to the present embodiment, the automatic setting function of the AF parameters may be employed with the function of customization setting of the AF parameters being omitted.

The above embodiments have exemplified the digital camera 100 including the optical system 110 and the lens driver 112. The imaging apparatus of the present embodiment does not have to include the optical system 110 or the lens driver 112, and may be, for example, an interchangeable lens camera.

In the above embodiments, a digital camera is described as an example of the imaging apparatus, but the imaging apparatus is not limited to the digital camera. The imaging apparatus of the present disclosure only has to be electronic device having an image shooting function (e.g., a video camera, a smartphone, and a tablet terminal).

In the above, the embodiments have been described as examples of the techniques in the present disclosure. For that purpose, the accompanying drawings and the detailed description are provided.

Therefore, the components illustrated in the accompanying drawings and described in the detailed description not only include components essential for solving the problem but also can include, to exemplify the techniques, components that are not essential for solving the problem. For this reason, it should not be immediately recognized that those unnecessary components are necessary only because those unnecessary components are described in the accompanying drawings or the detailed description.

Since the embodiments described above are merely examples of the techniques in the present disclosure, various modifications, replacements, additions, omissions, and the like can be made in the scope of the claims or in an equivalent scope thereof.

The present disclosure is applicable to an imaging apparatus that performs an AF operation.

The invention claimed is:

1. An imaging apparatus comprising:
an image sensor that captures a subject image formed via an optical system to generate image data;
a controller that controls an autofocus operation to focus the optical system; and
an image recognizer that identifies, based on the image data, a class of a subject in an image shown by the image data, from among a plurality of different classes of a subject, each of the different classes of a subject having associated therewith a corresponding movement property indicative of an ability of a subject within the class to move within the image shown by the image data,
wherein the controller acquires the class of the subject identified by the image recognizer, and
automatically set a parameter indicating characteristics of the autofocus operation, based on the movement property associated with the class of the subject of the identified by the image recognizer.

2. The imaging apparatus according to claim 1, wherein the controller estimates a tendency of the subject to move on the image, based on the class of subject identified by the image recognizer and information set in the imaging apparatus, and
the controller automatically sets the parameter of the autofocus operation, based on an estimation result of the tendency.

3. The imaging apparatus according to claim 2, wherein the controller calculates a movement amount indicating the estimation result of the tendency, based on a size of the subject on the image and the class of the subject that are identified by the image recognizer, and a focal length and a focus position set in the imaging apparatus.

4. The imaging apparatus according to claim 1, wherein the controller performs, based on the automatically set parameter, the autofocus operation with the characteristics indicated by the parameter being used on a response when the subject moves during performance of the autofocus operation.

5. The imaging apparatus according to claim 1, wherein the image recognizer further identifies a scene in which the image shown by the image data is captured, and
the controller automatically sets the parameter of the autofocus operation, based on an estimated possibility for the subject to move in the scene identified by the image recognizer.

6. The imaging apparatus according to claim 1, wherein the parameter includes at least one of: sensitivity with which the focus position is made to track in the autofocus operation; sensitivity with which an area as a focus target is switched in the autofocus operation; or a degree to use movement prediction of the subject, in the autofocus operation.

7. The imaging apparatus according to claim 1, further comprising an operation interface that receives an operation to select whether the parameter is automatically set or is set by a user operation.

* * * * *